Patented Dec. 30, 1952

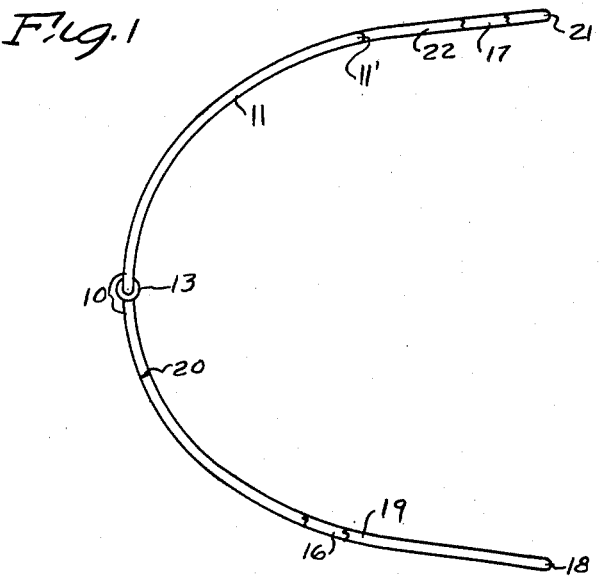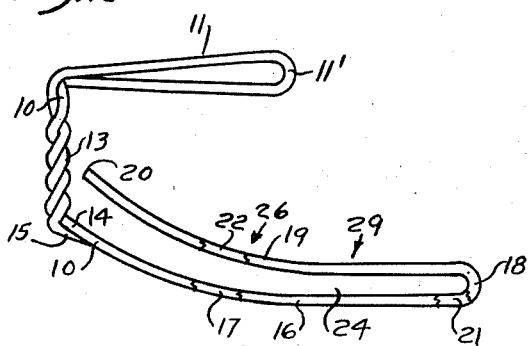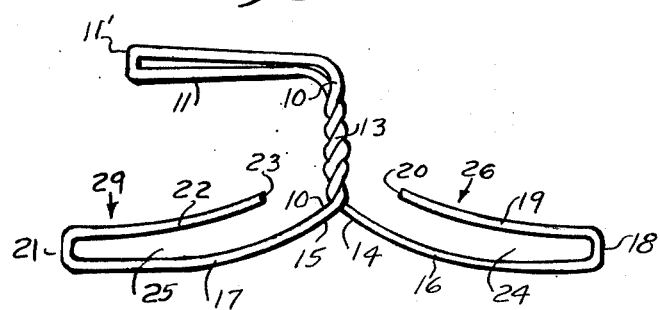

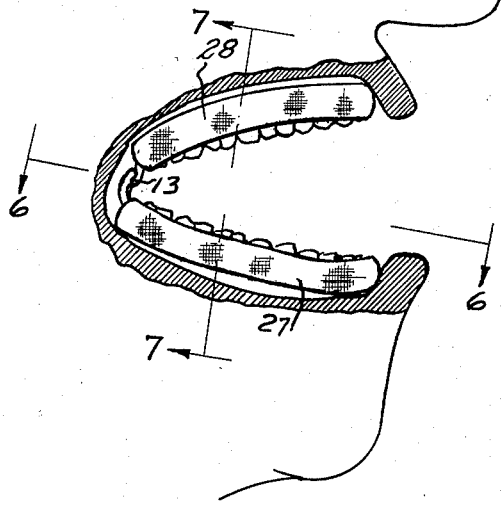
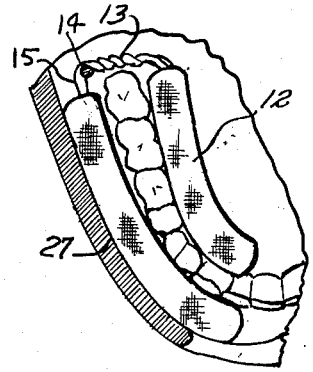
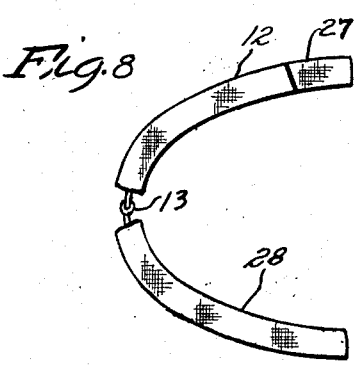
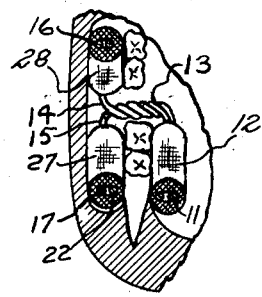
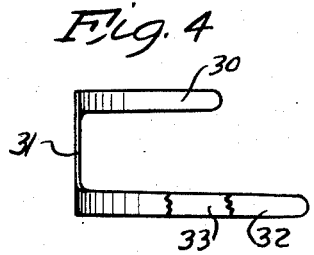

2,623,284

UNITED STATES PATENT OFFICE 2,623,284

MEANS FOR ISOLATING TEETH FROM MOISTURE DURING DENTAL OPERATIONS

Ralph W. Ackley, Minneapolis, Minn.

Application May 7, 1949, Serial No. 91,896

4 Claims. (Cl. 32—35)

My invention relates to a means for isolating teeth from moisture during dental operations, and has for its object to hold suitable lengths of cotton roll in position on each side of the teeth at one side of a lower jaw between the teeth and the lip on one side and the tongue and teeth on the other side, and at the same time to hold a suitable length of cotton roll on the outside of one side of the upper jaw between the teeth and the upper lip and cheek.

Cotton roll is a standard material used in dental operations, which consists of an outer water-pervious casing and a tube of absorbent cotton within the casing. Generally speaking it is circular in cross section with an opening through its center. It comes in extended rolls and may be cut to any desired length.

The purpose of using cotton roll is to exclude moisture from the tooth surfaces being worked upon. Heretofore during dental operations an assistant has been employed to hold the cotton roll in position. This not only increases the cost of the dental operation by requiring an additional operator, but in holding the cotton roll in position at least two of the assistant's fingers have to go into the mouth cavity and are often very much in the way of operative procedures.

Moreover, as practiced heretofore, it has never been practical to isolate the entire half of a jaw at one time, or to isolate the teeth of both upper and lower jaws simultaneously.

To meet these very real difficulties, I discovered that a simple metal member can be provided with metal extensions or arms adapted to be inserted into the center opening of the tubular cotton roll, these members being of such a nature that they will hold any desired length of cotton roll, and being so positioned that two of them will hold the cotton roll on each side of the lower jaw and one connected therewith will hold the cotton roll between the teeth of the upper jaw and the inside of the upper lip. The members for the lower jaw do not extend clear around the front teeth, so the cotton roll held by them may be made long enough to come between the front teeth and the lower lip and to extend alongside the tongue on the other side and in that manner be held in place.

My cotton-roll holder effects, without the aid of any assistant the following desirable and highly advantageous results:

1. It prevents dilution of medicine that may be used in connection with the treatment of teeth, which would follow the introduction of saliva at the point where the medicine is applied.

2. It prevents moisture (from the saliva) from getting into the area where fillings are to be set, both while the cavities are being formed and more particularly when the setting of the filling takes place.

3. It gives the operator opportunity for better observation of the teeth while they are being worked upon, both in the cleaning out of the cavity and in the setting of a filling.

4. It aids the patient in maintaining his mouth open during operative treatment. Ordinarily mouth props are not used for this purpose and the patient's muscles may become overtired from long continued holding the mouth open. The cotton roll held by my appliance gives a certain amount of yielding support which relieves the tension of long-continued muscle strain.

It is a principal object of my invention, therefore, to provide a dental isolating member which may be formed of any suitable material such as metal, plastic or the like, of stampings or moldings, but preferably of wire, which has arms shaped to fit on each side of one side of the lower jaw and on the outside of one side of the upper jaw, and to place upon said arms lengths of cotton roll adapted to the work being done, said lengths being, if desired, sufficient to extend about the front teeth of the patient.

It is a further object of my invention to form a holding member with a continuous portion roughly U-shaped which carries at one side a pair of arms spaced to lie on either side of the teeth of a lower jaw, and a single arm adapted to extend between the upper teeth and the upper lip.

It is a further object of my invention to form the cotton roll holder of a single strand of wire fabricated to give a closed loop arm adapted to extend along the inside of the lower teeth at one side of the lower jaw, to have a base member of twisted wire extending therefrom and two open loops of wire connected with the base member forming arms spreading apart, one adapted to extend along the outside of the lower teeth at one side of the lower jaw, the other arm to extend along the outside of the upper teeth at one side of the upper jaw. On each of the arms, however formed, there will, of course, be a length of cotton roll applied thereto to be held in position by the holder as applied to the mouth of a patient.

The full objects and advantages of my invention will appear in connection with the detailed description thereof given in the following specification, and the novel features of my invention by which the aforesaid important and valuable results are obtained will be particularly pointed out in the claims.

In the drawings illustrating an application of by invention in some of its forms:

Fig. 1 illustrates a plan view of the holder member per se, formed of properly positioned wire, taken from the side of the shorter arm.

Fig. 2 is a side elevation of what is shown in Fig. 1 taken from the side of the holder provided with only one arm, and with the corresponding arm of the two diverging arms shown one above the other, portions of the concealed one of said arms disclosed by breaking away parts of the other arm.

Fig. 3 is a top edge view of the holding member taken along the twisted base with the single arm shown in the upper part of the figure and the two diverging arms shown in the lower part of the figure.

Fig. 4 illustrates a side elevation view of a device having the functions of my invention stamped from sheet metal, with some parts broken away.

Fig. 5 is a side elevation view of the holding member as positioned in the mouth of a patient with portions of the side walls of the mouth revealed showing the member in position, the arms having secured thereon cotton roll parts in their position in relation to the teeth, the cheeks, and the lips of the wearer.

Fig. 6 is a sectional plan view taken on substantially line 6—6 of Fig. 5.

Fig. 7 is a sectional elevation view taken on line 7—7 of Fig. 5.

Fig. 8 is a view similar to Fig. 1 on a smaller scale with the cotton roll applied.

Referring to Figs. 1, 2 and 3, in which the preferred form of the holder per se is shown, that is the form in which the holder is made of a single strand of twisted wire, the wire 10 is shown formed as having a member 11 linearly looped back on itself at 11' which comprises an arm adapted to hold a length of cotton roll 12, as shown in Figs. 6 to 8.

The wire 10 is twisted together to form a supporting stem or linear base member 13, as shown in Figs. 2, 3 and 6. From the bottom of stem 13 the two end portions of the wire 10 extend angularly at 14 and 15 into arm portions 16 and 17, which portions are looped at 18 and 21 respectively, Figs. 2 and 3. The portion 16 of the wire 10 is looped backwardly at 18 on itself in a return strand 19 which terminates at 20 leaving a space 24 between the portions 16 and 19.

This member designated generally as 26, is adapted to receive a length of cotton roll 28, which, when in position in the mouth of a patient, will be held along the upper jaw between the outside of the teeth and the upper lip and cheek.

The portion 17 of wire 10 which bends angularly outwardly at 15 is looped at 21 in a backwardly turned strand 22 which terminates at 23, leaving a space 25 between the two strands. This member is designated generally as 29 and is substantially parallel, but variable in position by bending, with the closed loop 11 and is adapted to be positioned in the mouth of the patient along the lower jaw between the outside of the teeth and the lip and cheek of the patient, where it will have positioned thereon a length of cotton roll 27, as shown in Figs. 5 and 6.

At the same time the closed loop 11 extending from base member 13 will take a position on the lower jaw along the inside of the teeth where it will block away the tongue and saliva from the salivary glands, as shown in Figs. 6 and 7, where the member 11 has thereon a length of cotton roll 12.

The parts 26 and 29 can be bent at 14 and 15 to bring them closer together or further apart. Likewise the parts 19 and 22 can be bent so as to make the spaces 24 and 25 larger or smaller, thus adapting them to receive a larger or smaller cotton roll sections, such as 12 and 27 heretofore described and 28 for the arm 26, as shown in Figs. 5 and 7, also to adapt them to variable spaces formed by the lip or cheek and tooth ridge of different patients.

In place of the wire construction of Figs. 1, 2 and 3, a construction such as shown in Fig. 4, which may be stamped out of sheet metal or molded from plastic and the like, comprises a top member 30 secured to a linear base or stem 31, and bottom members 32 and 33 which extend at right angles from the base and are divergingly curved as are the members 26 and 29 of Fig. 3.

In this form the stem 31 is the equivalent of the twisted wire base member 13. The arms 32 and 33 are diverging, the arm 33 going along the teeth of the upper jaw while the arm 32 is parallel with the arm 30 and lies along the lower jaw between the outside of the teeth and the lip and cheek. The arm 30 lies along the inside of the teeth of the lower jaw.

In this form of holder the lengths of cotton roll will be applied in exactly the same manner, as indicated in Figs. 5 and 7, the only difference being that the holder there shown is the preferred form of the wire holder rather than of the stamped metal holder shown in Fig. 4.

It will be understood that the lengths of cotton roll employed is not determined by the length of the arms, such as 11, 26 and 29. Any length of cotton roll may be employed according to the requirements of the work being done. As above stated, the cotton roll 27 used on arm 29 may be extended so as to lie under the lip on the outside of the front teeth, while the cotton roll 28 used on arm 11 may be extended to lie under the tongue about the back of the front teeth, and the holder together with the lower lip and the tongue will readily hold such extended cotton roll sections in position.

The advantages of my invention will be apparent from the foregoing description. The primary advantage resides in the fact that the holding means constituting my invention, however formed or whatever material used, will better isolate from moisture teeth being operated upon than can be done by hand. Not only that, the holder means makes possible very elastic use of cotton roll because of its adaptability, together with parts in and about the mouth, to hold sections of varying length which may extend considerable distances beyond the ends of the holding means.

A further very great advantage of my invention resides in the fact that it eliminates the use of an assistant to hold the cotton roll in position with his fingers, thus reducing the expense of the tooth work both to the dentist and to the patient.

Otherwise the advantages of my invention are well pointed out in detail in paragraphs numbered 1, 2, 3 and 4 heretofore appearing in the specification.

Another advantage resides in the fact that the holding structure can readily be made as two independent but similar members, one applicable to the right side of the mouth and the other to the left side of the mouth, and the application of cotton roll lengths will be the same as to each of them.

I claim:

1. A dental appliance, comprising a linear base member having opposite ends, a first arm extending angularly from one side of one end of the base member, a second arm extending angularly from the other side of the first end of the base member and in the same plane as the first arm, a third arm extending from one side of the other end of the base member and in an angle substantially parallel with the first arm, and a cotton roll on each arm and extending away from the base member, said device being adapted for positioning in the mouth with the base member extending transversely in rear of the rearmost back tooth of the lower jaw with the first and third arms on either side of the row of lower teeth and the second arm between the row of upper teeth and the inner surface of the upper lip.

2. A dental appliance, comprising a holder formed of a single strand of wire, the central portion of said wire formed into a linear loop, the meeting ends of the loop strands twisted together and bent at substantially a right angle to the loop to form a base, the strands extending from the other end of the base recurrently bent and formed into arms, one of which is substantially parallel with the linear loop, and a length of cotton roll enclosing said loop and each of said arms, said device being adapted for positioning in the mouth with the base extending transversely in rear of the rearmost tooth with one of said arms and said loop on opposite sides of a row of teeth of one jaw and the other arm between the teeth and lip of the other jaw.

3. A dental device, comprising a holder formed of a single strand of wire, the central portion of said wire formed in a linear loop, the meeting ends of the loop strands twisted together and bent at a right angle from the loop to form a base, the strands extending from the other end of the base constituting arms, one of which is substantially parallel with the loop, and with the loop alternately extend on either side of a row of teeth when the base is positioned in rear of the row of teeth, the other arm extending angularly from the base for positioning between the cheek and the opposing row of teeth, and an absorbent pad surrounding said loop and each of the arms to isolate the teeth from moisture in the mouth.

4. A dental device, comprising a holder formed of a single strand of wire, the central portion of said wire formed in a linear loop to provide one arm, the meeting ends of said wire twisted about each other from the loop and bent at substantially a right angle to the loop to form a base with the end portions extending therefrom, one of said end portions formed as an arm that extends substantially parallel with the loop, the other of said end portions formed as an arm extending in a curve from the base and in substantially the same plane as the first of said portions, said loop and said arms being adapted to receive an absorbent roll which extends outwardly from the base.

RALPH W. ACKLEY.

REFERENCES CITED

The following references are of record in the file of this patent:

UNITED STATES PATENTS

| Number | Name | Date |
| --- | --- | --- |
| 531,094 | Bronson | Dec. 18, 1894 |
| 641,170 | Thurmond et al. | Jan. 9, 1900 |
| 802,483 | Simmons | Oct. 24, 1905 |
| 1,229,595 | DuBrul | June 12, 1917 |